United States Patent
Ding et al.

(10) Patent No.: US 11,308,727 B2
(45) Date of Patent: Apr. 19, 2022

(54) FINGERPRINT DETECTION DEVICE AND FINGERPRINT DETECTION METHOD

(71) Applicant: BOE TECHNOLOGY GROUP CO., LTD., Beijing (CN)

(72) Inventors: Xiaoliang Ding, Beijing (CN); Xue Dong, Beijing (CN); Haisheng Wang, Beijing (CN); Yingming Liu, Beijing (CN); Wei Liu, Beijing (CN); Jiabin Wang, Beijing (CN); Yangbing Li, Beijing (CN); Pengpeng Wang, Beijing (CN); Ping Zhang, Beijing (CN); Likai Deng, Beijing (CN); Bo Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 276 days.

(21) Appl. No.: 16/622,557

(22) PCT Filed: May 30, 2019

(86) PCT No.: PCT/CN2019/089336
§ 371 (c)(1),
(2) Date: Dec. 13, 2019

(87) PCT Pub. No.: WO2019/228470
PCT Pub. Date: Dec. 5, 2019

(65) Prior Publication Data
US 2020/0175245 A1 Jun. 4, 2020

(30) Foreign Application Priority Data

May 31, 2018 (CN) .................. 201810550911.X

(51) Int. Cl.
*G06V 40/13* (2022.01)
*H04N 5/378* (2011.01)
*G06K 9/00* (2022.01)

(52) U.S. Cl.
CPC ....... *G06V 40/1318* (2022.01); *G06K 9/0051* (2013.01); *H04N 5/378* (2013.01)

(58) Field of Classification Search
CPC .... G06K 9/0004; G06K 9/0051; H04N 5/378; G06V 40/1318; G06V 40/1347
See application file for complete search history.

(56) References Cited

U.S. PATENT DOCUMENTS 10,146,985 B2 12/2018 Chung et al.
2005/0122119 A1 6/2005 Barlow
(Continued)

FOREIGN PATENT DOCUMENTS

| CN | 101858941 A | 10/2010 |
|---|---|---|
| CN | 107679444 A | 2/2018 |
| CN | 108805066 A | 11/2018 |

OTHER PUBLICATIONS

First office action dated Oct. 8, 2019 for application No. 201810550911.X with English translation attached.

*Primary Examiner* — Antonio Xavier
(74) *Attorney, Agent, or Firm* — Nath, Goldberg & Meyer; Joshua B. Goldberg

(57) ABSTRACT

The present disclosure provides a fingerprint detection device and method. The fingerprint detection device includes a detection substrate and a signal converter. The detection substrate includes pixels arranged in rows and columns. Each pixel includes a sensing circuit configured to receive an optical signal and output a sensing electrical signal according to the received optical signal. The signal converter includes A/D converters each coupled to one column of sensing circuits. The fingerprint detection device (Continued)

further includes a control circuit coupled to the sensing circuits and the A/D converters and configured to obtain common mode component of sensing electrical signals output by sensing circuits of at least part of the pixels and provide information about the common mode component to the A/D converters. The A/D converter is configured to perform analog-to-digital conversion on difference between the sensing electrical signal from corresponding sensing circuit and the common mode signal.

18 Claims, 4 Drawing Sheets

(56) References Cited

U.S. PATENT DOCUMENTS

| | | | |
|---|---|---|---|
| 2017/0068835 A1* | 3/2017 | Kravets | G06K 9/0002 |
| 2018/0039809 A1* | 2/2018 | Chung | G06K 9/0002 |
| 2018/0039810 A1* | 2/2018 | Hwang | H01L 23/528 |
| 2019/0098245 A1* | 3/2019 | Kim | H03M 1/56 |
| 2019/0212873 A1* | 7/2019 | Huang | G06F 3/0418 |
| 2019/0246058 A1* | 8/2019 | Kim | H04N 5/37455 |
| 2020/0175245 A1 | 6/2020 | Ding et al. | |

* cited by examiner

FINGERPRINT DETECTION DEVICE AND FINGERPRINT DETECTION METHOD

CROSS REFERENCE TO RELATED APPLICATIONS

The present application is a National Phase Application filed under 35 U.S.C. 371 as a national stage of PCT/CN2019/089336, filed on May 30, 2019, an application claiming priority from Chinese patent application No. 201810550911.X, filed on May 31, 2018, the contents of which are incorporated herein by reference in their entirety.

TECHNICAL FIELD

The present disclosure relates to the field of fingerprint detection, and in particular, to a fingerprint detection device and a fingerprint detection method.

BACKGROUND

In a fingerprint detection device, a photodiode is provided in each pixel. In the process of scanning a fingerprint, due to the difference between ridges and valleys of the fingerprint, light rays irradiated on the fingerprint are reflected differently, which results in different light intensities sensed by photodiodes. By reading out currents of all photodiodes in sequence, detection of the valleys and ridges of the fingerprint can be realized.

SUMMARY

In an aspect, the present disclosure provides a fingerprint detection device, including a detection substrate and a signal converter, the detection substrate includes a plurality of pixels arranged in a plurality of rows and a plurality of columns, each pixel includes a sensing circuit configured to receive an optical signal and output a sensing electrical signal according to the received optical signal; the signal converter includes a plurality of analog-to-digital converters each coupled to one column of sensing circuits, the fingerprint detection device further includes a control circuit coupled to the sensing circuits and the plurality of analog-to-digital converters and configured to: obtain a common mode component of sensing electrical signals output by the sensing circuits of at least part of the plurality of pixels and provide information about the common mode component to the plurality of analog-to-digital converters, and the analog-to-digital converter is configured to perform analog-to-digital conversion on a difference between the sensing electrical signal from a corresponding sensing circuit and the common mode component.

In some embodiments, the analog-to-digital converter includes a signal input terminal and a reference terminal, the control circuit is configured to provide the information about the common mode component to one of the signal input terminal and the reference terminal of the analog-to-digital converter such that a difference between signals received by the signal input terminal and the reference terminal of the analog-to-digital converter is equal to the difference between the sensing electrical signal from a corresponding sensing circuit and the common mode component.

In some embodiments, the signal input terminal of each analog-to-digital converter is coupled to an output terminal of each sensing circuit in a corresponding column, the control circuit includes: a comparison sub-circuit configured to obtain sensing electrical signals output from at least part of the sensing circuits and output a smallest one of the obtained sensing electrical signals as a reference signal in a first fingerprint detection sub-period; a plurality of switch sub-circuits in one-to-one correspondence with the plurality of analog-to-digital converters, each switch sub-circuit having a first input terminal coupled to an output terminal of the comparison sub-circuit and an output terminal coupled to the reference terminal of a corresponding analog-to-digital converter; and a first control sub-circuit configured to control the first input terminal and the output terminal of each switch sub-circuit to be electrically connected to output the reference signal in a second fingerprint detection sub-period, wherein the second fingerprint detection sub-period is subsequent to the first fingerprint detection sub-period.

In some embodiments, the switch sub-circuit has a second input terminal coupled to ground, and the first control sub-circuit is further configured to control the second input terminal and the output terminal of each switch sub-circuit to be electrically connected in the first fingerprint detection sub-period.

In some embodiments, the signal input terminal of each analog-to-digital converter is coupled to an output terminal of each sensing circuit in a corresponding column, and the reference terminal of each analog-to-digital converter is grounded; the control circuit includes: a plurality of capacitors sequentially coupled in series, both terminals of each of the plurality of capacitors being coupled to output terminals of two adjacent sensing circuits, respectively; a plurality of switching transistors in one-to-one correspondence with the plurality of sensing circuits, each of the plurality of switching transistors having a first electrode coupled to an output terminal of a corresponding sensing circuit, and a second electrode coupled to ground; and a second control sub-circuit coupled to a control electrode of each switching transistor and configured to: provide a turn-off signal to the control electrode of the switching transistor in a first fingerprint detection sub-period; and provide a turn-on signal to the control electrode of the switching transistor in a second fingerprint detection sub-period, a time at which the second fingerprint detection sub-period starts being subsequent to a time at which the first fingerprint detection sub-period starts.

In some embodiments, the fingerprint detection device further includes a calculation circuit coupled to each analog-to-digital converter and configured to determine a difference between the sensing electrical signals output by any two adjacent sensing circuits according to an output signal of each analog-to-digital converter, and determine a fingerprint image according to the difference between the sensing electrical signals output by any two adjacent sensing circuits.

In some embodiments, the sensing circuit includes: a photodiode having an anode coupled to a low-level signal terminal; a first transistor having a control electrode coupled to a reset terminal of the sensing circuit, a first electrode coupled to a high-level signal terminal, and a second electrode coupled to a cathode of the photodiode; a second transistor having a control electrode coupled to the cathode of the photodiode, and a first electrode coupled to the high-level signal terminal; and a third transistor having a control electrode coupled to a scan terminal of the sensing circuit, a first electrode coupled to a second electrode of the second transistor, and a second electrode coupled to an output terminal of the sensing circuit; the output terminal of each sensing circuit is coupled to a current source.

In some embodiments, the signal converter further includes a plurality of amplifiers coupled to the plurality of analog-to-digital converters in one-to-one correspondence, each of the plurality of amplifiers having an output terminal coupled to a signal input terminal of a corresponding analog-to-digital converter, and an input terminal coupled to the output terminal of each sensing circuit in a corresponding column.

In some embodiments, the comparison sub-circuit obtains only sensing electrical signals output by the sensing circuits in an area of the detection substrate covered by a fingerprint, and outputs a smallest one of the obtained sensing electrical signals as the reference signal.

In some embodiments, the comparison sub-circuit obtains a pixel having a smallest brightness by detecting brightness of each pixel, and outputs the sensing electrical signal output by the sensing circuit in the obtained pixel as the reference signal.

In another aspect, the present disclosure also provides a fingerprint detection method used in a fingerprint detection device, the fingerprint detection device includes a detection substrate and a signal converter, the detection substrate includes a plurality of pixels arranged in a plurality of rows and a plurality of columns, each pixel includes a sensing circuit configured to receive an optical signal and output a sensing electrical signal according to the received optical signal; the signal converter includes a plurality of analog-to-digital converters each coupled to one column of sensing circuits, the fingerprint detection method including:

obtaining a common mode component of sensing electrical signals output by the sensing circuits of at least part of the plurality of pixels and providing information about the common mode component to the plurality of analog-to-digital converters by a control circuit, and performing, by the analog-to-digital converter, analog-to-digital conversion on a difference between the sensing electrical signal from a corresponding sensing circuit and the common mode component.

In some embodiments, the analog-to-digital converter includes a signal input terminal and a reference terminal, and providing the information about the common mode component to the plurality of analog-to-digital converters includes: providing information about the common mode component to one of the signal input terminal and the reference terminal of the analog-to-digital converter such that a difference between signals received by the signal input terminal and the reference terminal of the analog-to-digital converter is equal to a difference between the sensing electrical signal of a corresponding sensing circuit and the common mode component.

In some embodiments, the signal input terminal of each analog-to-digital converter is coupled to an output terminal of each sensing circuit in a corresponding column, and the control circuit includes a comparison sub-circuit, a switch sub-circuit and a first control sub-circuit, obtaining a common mode component of sensing electrical signals output by the sensing circuits of at least part of the plurality of pixels and providing information about the common mode component to the plurality of analog-to-digital converters by a control circuit includes:

in a first fingerprint detection sub-period, obtaining sensing electrical signals output by at least part of the sensing circuits and providing a smallest one of the obtained sensing electrical signals as a reference signal to the switch sub-circuit by the comparison sub-circuit; and in a second fingerprint detection sub-period, controlling, by the first control sub-circuit, the switch sub-circuit to provide the reference signal to the reference terminal of a corresponding analog-to-digital converter, the second fingerprint detection sub-period being subsequent to the first fingerprint detection sub-period.

In some embodiments, during the first fingerprint detection sub-period, the first control sub-circuit controls the switch sub-circuit to provide a grounded signal to the reference terminal of a corresponding analog-to-digital converter.

In some embodiments, the signal input terminal of each analog-to-digital converter is coupled to an output terminal of each sensing circuit in a corresponding column, and the reference terminal of each analog-to-digital converter is grounded;

the control circuit includes: a plurality of capacitors sequentially coupled in series, both terminals of each of the plurality of capacitors being coupled to output terminals of two adjacent sensing circuits, respectively; a plurality of switching transistors in one-to-one correspondence with the plurality of sensing circuits, each switching transistor having a first electrode coupled to the output terminal of a corresponding sensing circuit, and a second electrode coupled to ground; and a second control sub-circuit coupled to a control electrode of each switching transistor, obtaining a common mode component of sensing electrical signals output by the sensing circuits of at least part of the plurality of pixels and providing information about the common mode component to the plurality of analog-to-digital converters by a control circuit includes: providing, by the second control sub-circuit, a turn-off signal to the control electrode of the switching transistor in a first fingerprint detection sub-period; and providing, by the second control sub-circuit, a turn-on signal to the control electrode of the switching transistor in a second fingerprint detection sub-period, wherein a time at which the second fingerprint detection sub-period starts is subsequent to a time at which the first fingerprint detection sub-period starts.

In some embodiments, the fingerprint detection device further includes a calculation circuit, and the fingerprint detection method further includes:

determining a difference between the sensing electrical signals output by any two adjacent sensing circuits according to an output signal of each analog-to-digital converter and determining a fingerprint image according to the difference between the sensing electrical signals output by any two adjacent sensing circuits by the calculation circuit.

In some embodiments, the comparison sub-circuit obtains only sensing electrical signals output by the sensing circuits in an area of the detection substrate covered by a fingerprint, and outputs a smallest one of the obtained sensing electrical signals as the reference signal.

In some embodiments, the comparison sub-circuit obtains a pixel having a smallest brightness by detecting brightness of each pixel, and outputs the sensing electrical signal output by the sensing circuit in the obtained pixel as the reference signal.

BRIEF DESCRIPTION OF THE DRAWINGS

Accompanying drawings, which constitute a part of the specification, are intended to provide a further understanding of the present disclosure, and are used for explaining the present disclosure together with the following specific implementations, rather than limiting the present disclosure. In the drawings.

DETAILED DESCRIPTION

The specific implementations of the present disclosure will be described in detail below with reference to the accompanying drawings. It should be understood that the specific implementations described herein are merely for the purpose of describing and explaining the present disclosure, and are not intended to limit the present disclosure.

When a fingerprint detection device determines fingerprint information based on electrical signals generated by photodiodes, the electrical signals need to be subjected to analog-to-digital conversion first. Generally, when performing analog-to-digital conversion on an electrical signal, the electrical signal is amplified and then directly output to an input terminal of an analog-to-digital converter. However, since light rays reflected from both ridges and valleys of a fingerprint will cause photodiodes to generate electrical signals, but only a difference between the electrical signals corresponding to the ridges and valleys is relevant to fingerprint detection, amplifying the electrical signals from the photodiodes and then directly outputting the amplified electrical signals to the analog-to-digital converter will result in a large amount of useless signals in the output values of the analog-to-digital converter, thereby reducing the conversion accuracy of the analog-to-digital converter.

Figure 1:
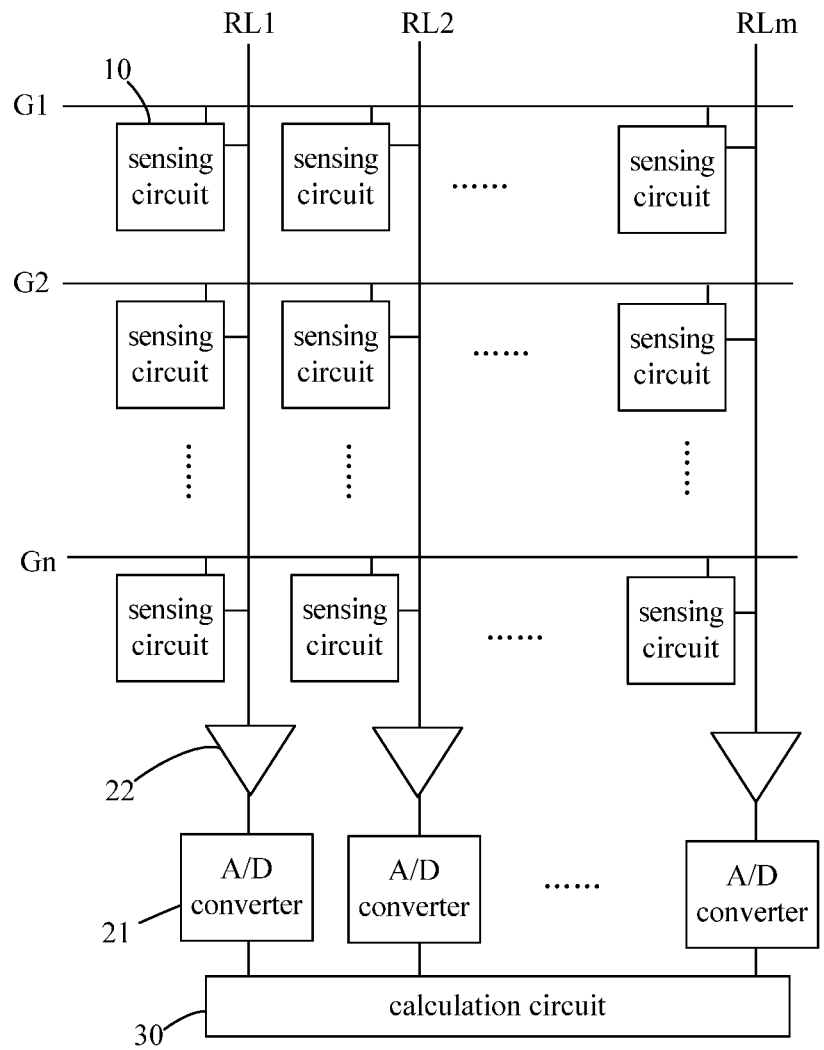
FIG. 1 is a schematic diagram of a circuit structure of a conventional fingerprint detection device.
Figure 2:
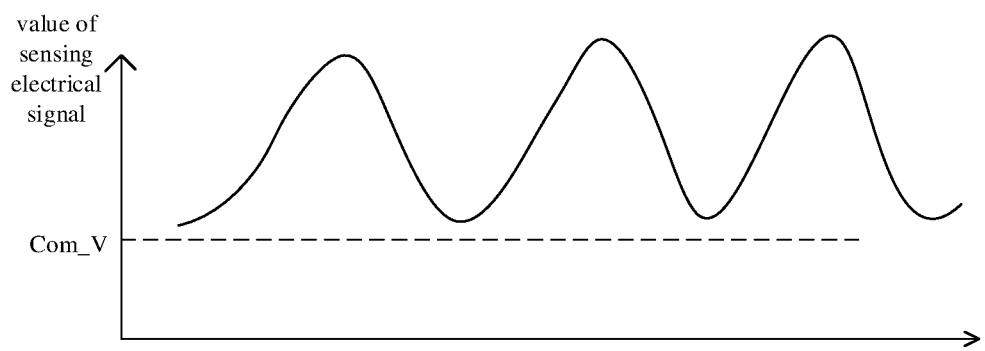
FIG. 2 is a schematic waveform diagram of a signal received by a conventional analog-to-digital converter.

FIG. 1 is a schematic diagram of a circuit structure of a conventional fingerprint detection device, and FIG. 2 is a schematic waveform diagram of a signal received by a conventional analog-to-digital converter. As shown in FIG. 1, the fingerprint detection device includes a plurality of sensing circuits 10 each configured to receive an optical signal and output a sensing electrical signal based on the received optical signal. In the process of fingerprint detection, scanning signals are supplied to scan lines G1 to Gn line by line, so that the sensing circuits 10 output sensing electrical signals line by line. Each signal readout line RL1 to RLm is coupled to output terminals of the sensing circuits 10 in a corresponding column. A sensing electrical signal output by the sensing circuit 10 is amplified by an amplifier 22 and then input to an analog-to-digital (A/D) converter 21 for analog-to-digital conversion. Due to different intensities of light rays reflected by the valleys and the ridges in a fingerprint, the sensing electrical signals output by the sensing circuits 10 corresponding to the valleys and the ridges have different magnitudes. A calculation circuit 30 determines a difference between the sensing electrical signals output by the sensing circuits 10 based on outputs of the analog-to-digital converters 21, so as to obtain features of the valleys and the ridges, thereby obtaining a fingerprint image.

As shown in FIG. 2, a sensing electrical signal generated based on light reflected by a valley of the fingerprint has a magnitude shown by the trough in FIG. 2, a sensing electrical signal generated based on light reflected by a ridge of the fingerprint has a magnitude shown by the peak in FIG. 2, and a common mode component, i.e., Com_V in FIG. 2, exists between the sensing electrical signals generated based on the light reflected by the valley and the ridge of the fingerprint. When identifying the fingerprint image based on the outputs of the analog-to-digital converters, it is the difference between the peak and the trough of the signal in FIG. 2, i.e., the difference between the sensing electrical signals output by different sensing circuits 10, that is used, but the common mode component Com_V is not used. Moreover, the common mode component may occupy the dynamic range of the analog-to-digital converter 21, and in the case of over-occupation of the dynamic range, the conversion accuracy of the analog-to-digital converter 21 may be reduced, to result in a reduced accuracy of fingerprint recognition.

Figure 3:
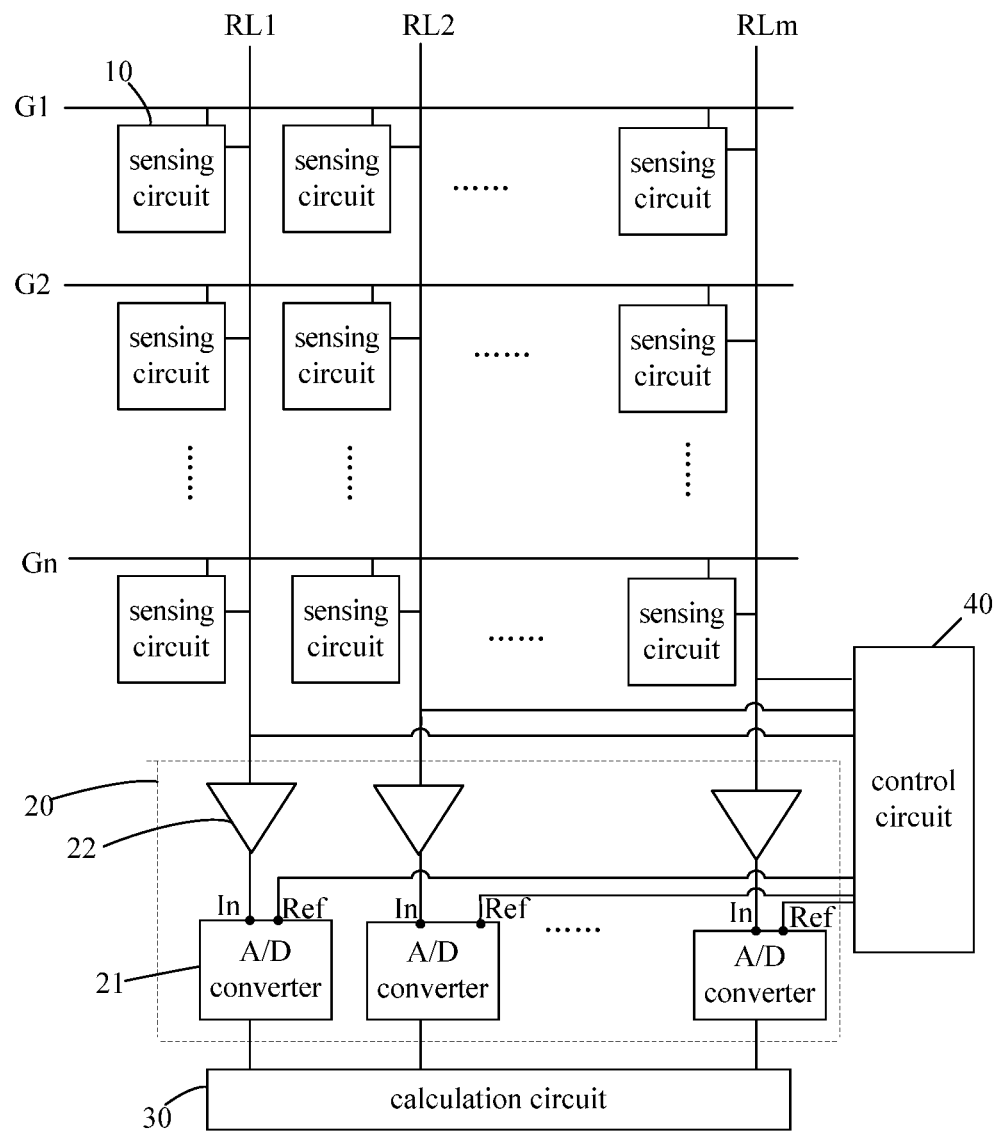
FIG. 3 is a schematic circuit diagram of a fingerprint detection device according to an embodiment of the present disclosure.

In order to improve the conversion accuracy of an analog-to-digital converter in a fingerprint detection device, the present disclosure provides a fingerprint detection device. FIG. 3 is a schematic circuit diagram of a fingerprint detection device according to an embodiment of the present disclosure. As shown in FIG. 3, the fingerprint detection device includes a detection substrate, a signal converter 20, and a control circuit 40. The detection substrate includes a plurality of pixels arranged in a plurality of rows and a plurality of columns. A sensing circuit 10 is disposed in each pixel and configured to receive an optical signal and output a sensing electrical signal having a magnitude corresponding to light information of the optical signal, and the light information of the optical signal includes but is not limited to light intensity. The signal converter 20 includes a plurality of analog-to-digital converters 21 each corresponding to one column of sensing circuits 10. The analog-to-digital converter 21 is configured to perform analog-to-digital conversion on a difference between an input signal received by its signal input terminal In and a reference signal received by its reference terminal Ref.

The control circuit 40 is coupled to the sensing circuits 10 and the analog-to-digital converters 21, and is configured to obtain a common mode component of the sensing electrical signals output by the sensing circuits 10 of at least part of the plurality of pixels and provide information about the common mode component to the plurality of analog-to-digital converters 21. In some embodiments, the analog-to-digital converter 21 includes a signal input terminal In and a reference terminal Ref; the control circuit 40 is configured to provide the information about the common mode component to one of the signal input terminal In and the reference terminal Ref of the analog-to-digital converter 21 such that a difference between signals received at the signal input terminal In and the reference terminal Ref of the analog-to-digital converter 21 is equal to the difference between the sensing electrical signal output by the corresponding sensing circuit 10 and a common mode component. In some embodiments, in a detection stage corresponding to any one sensing circuit 10 in each fingerprint detection period, a common mode component of the sensing electrical signals output by at least two sensing circuits 10 including the one sensing circuit 10 is obtained, and according to the obtained common mode component, an input signal is provided to the signal input terminal In of the analog-to-digital converter 21 corresponding to the one sensing circuit 10 and/or a reference signal is provided to the reference terminal Ref of the analog-to-digital converter 21 corresponding to the one sensing circuit 10 such that a difference between the signals received at the signal input terminal In and the reference terminal Ref of the analog-to-digital converter 21 is equal to a difference between the sensing electrical signal output by the corresponding sensing circuit 10 and the common mode component.

It could be understood that the detection stages corresponding to different sensing circuits 10 in a same column do not overlap with each other, so as to ensure that the analog-to-digital converter 21 performs analog-to-digital conversion on the signal from the output terminal of only one sensing circuit 10 at most in every moment.

It is to be noted that, the detection stage corresponding to the sensing circuit 10 refers to a stage in which the sensing circuit 10 outputs a sensing electrical signal according to the received optical signal, and the detection stage is not necessarily a time period continuous in time, and may also include time periods discontinuous in time. Further, each fingerprint detection period may include two fingerprint detection sub-periods: a first fingerprint detection sub-period and a second fingerprint detection sub-period. In each fingerprint detection sub-period, the sensing circuits 10 may be driven line by line, so that the sensing circuits 10 output sensing electrical signals line by line until driving of all the sensing circuits 10 are completed once. In this case, the line-by-line driving of all the sensing circuits 10 can be completed twice in each fingerprint detection period. Accordingly, the detection stage of each sensing circuit 10 may include two time periods (detection sub-stages) during which the sensing circuit 10 outputs sensing electrical signals in two fingerprint detection sub-periods, respectively. In some embodiments, the common mode component obtained by the control circuit 40 may be a common mode component of the sensing electrical signals output by the at least two sensing circuits 10 in the first fingerprint detection sub-period. It could be understood that in the case of n rows of sensing circuits, each fingerprint detection sub-period may include n detection sub-stages corresponding to n rows of sensing circuits, respectively.

It should be further noted that the common mode component of the sensing electrical signals output by at least two sensing circuits 10 refers to a signal component that is included in each of the sensing electrical signals output by the at least two sensing circuits 10. For example, in a case where three sensing circuits output sensing electrical signals of 5V, 7V and 10V, respectively, the common mode component of the three sensing electrical signals is 5V.

In some embodiments, during the detection stage corresponding to any one sensing circuit 10, the control circuit 40 may calculate a difference between the sensing electrical signal output by the sensing circuit 10 and a common mode component of the sensing electrical signals output by at least two sensing circuits 10 including the one sensing circuit 10, and provide a signal corresponding to the difference to the signal input terminal of the analog-to-digital converter 21, and in this case, the reference terminal of the analog-to-digital converter 21 may be grounded. In some embodiments, during the detection stage corresponding to any one sensing circuit 10, the control circuit 40 provides the sensing electrical signal output by the sensing circuit 10 to the signal input terminal In of the corresponding analog-to-digital converter 21, and provides the common mode component of the sensing electrical signals output by at least two sensing circuits 10 including the one sensing circuit 10 to the reference terminal Ref of the corresponding analog-to-digital converter 21. The way of providing information about the common mode component to the analog-to-digital converter 21 is not limited in the present disclosure, as long as the difference between the signals respectively received at the signal input terminal and the reference terminal of the analog-to-digital converter 21 is equal to the difference between the sensing electrical signal output by the sensing circuit 10 and the common mode component.

As described above, what is used in a fingerprint identification process is the differences between the sensing electrical signals output by the sensing circuits 10, but not the common mode component, and the conversion accuracy of the analog-to-digital converter 21 is affected in the case of a too large common mode component. In the present disclosure, in the detection stage of any sensing circuit 10, the difference between the signals received by the signal input terminal In and the reference terminal Ref of the analog-to-digital converter 21 coupled to the sensing circuit 10 is the difference between the sensing electrical signal output by the sensing circuit 10 and the common mode component, therefore, the common mode component is removed from the sensing electrical signals output by at least part of the sensing circuits 10, and thus the occupation of the dynamic range of the analog-to-digital converter 21 by the common mode component is reduced, thereby improving both the conversion accuracy of the analog-to-digital converter 21 and the accuracy of fingerprint identification. For example, when the sensing electrical signals generated by two sensing circuits 10 according to the received optical signals are voltage signals of 10V and 20V, respectively, the conventional analog-to-digital converter 21 needs to perform analog-to-digital conversion on the analog signals of 10V and 20V, respectively; in the present disclosure, however, the common mode component of the two sensing circuits 10 is 10V, and the analog-to-digital converter 21 only needs to perform analog-to-digital conversion on the analog signal of 0V (=10V−10V) and the analog signal of 10V (=20V−10V), respectively.

Two implementations of the fingerprint detection device of the present disclosure will be described below with reference to FIGS. 3 to 5.

Figure 4:
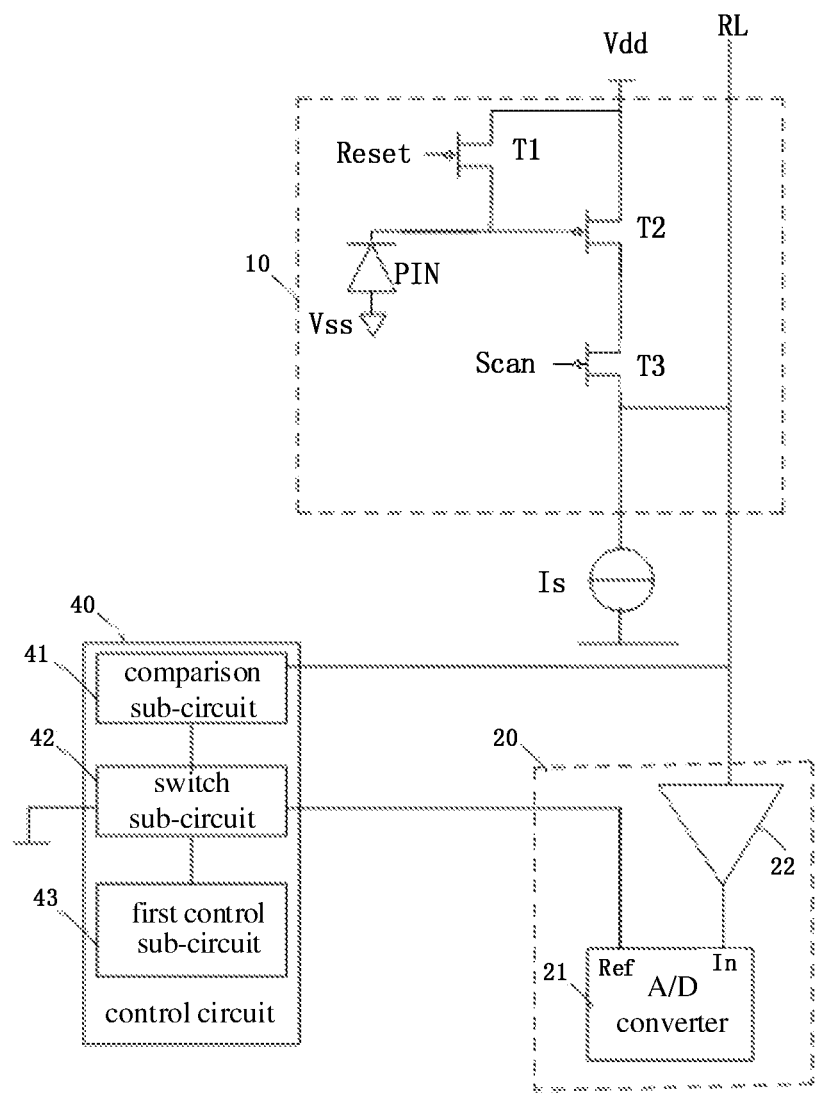
FIG. 4 is a schematic diagram illustrating connection between a sensing circuit, a control circuit, and a signal converter in a fingerprint detection device according to an embodiment of the present disclosure.

FIG. 4 is a schematic diagram illustrating connections between a sensing circuit, a control circuit, and a signal converter in a fingerprint detection device according to an embodiment of the present disclosure. As shown in FIG. 3, the detection substrate is provided thereon with a plurality of signal readout lines RL1 to RLm, each of which is coupled to output terminals of one column of sensing circuits 10. The signal converter 20 further includes a plurality of amplifiers 22 coupled to the plurality of analog-to-digital converters 21 in one-to-one correspondence. An output terminal of the amplifier 22 is coupled to the signal input terminal In of the analog-to-digital converter 21, and an input terminal of the amplifier 21 is coupled to the output terminals of the sensing circuits 10 in a corresponding column, i.e., coupled to a corresponding signal readout line, so that the signal input terminal In of each analog-to-digital converter 21 is coupled to the output terminal of each sensing circuit 10 in the corresponding column.

In some embodiments, the sensing circuit is an active pixel circuit (APS). As shown in FIG. 4, the sensing circuit includes a photodiode PIN, a reset transistor T1, a following transistor T2, and a gating transistor T3. The photodiode PIN has an anode coupled to a low-level signal terminal VSS, and a cathode coupled to a second electrode of the reset transistor T1, and the low-level signal terminal VSS may be a grounded terminal. The reset transistor T1 has a control electrode coupled to a reset terminal Reset of the sensing circuit 10 and a first electrode coupled to a high-level signal terminal Vdd. The following transistor T2 has a control electrode coupled to the cathode of the photodiode PIN and a first electrode coupled to the high-level signal terminal Vdd. The gating transistor T3 has a control electrode coupled to a scan terminal Scan of the sensing circuit 10, a first electrode coupled to a second electrode of the following transistor T2, and a second electrode coupled to the output terminal of the sensing circuit 10. The scan terminal Scan of the sensing circuit 10 is coupled to a corresponding scan line. The fingerprint detection device further includes a current source Is, and the output terminal of each sensing circuit 10 is further coupled to the current source Is.

The fingerprint detection device may further include a driving circuit (not shown) configured to provide a driving signal to the sensing circuit 10, so as to enable the sensing circuit 10 to output a corresponding sensing electrical signal according to a received optical signal. Before fingerprint detection, the driving circuit controls the reset transistor T1 to be turned on to reset the photodiode PIN and then controls the reset transistor T1 to be turned off, the photodiode PIN is illuminated by light to perform photocurrent integration, the gating transistor T3 is controlled to be turned on after a certain period of integration, and the current source acts on the following transistor T2, so that a voltage change of the cathode of the photodiode PIN is transmitted to the input terminal of the amplifier 22 through the following transistor T2 and then output to the analog-to-digital converter 21 for analog-to-digital conversion after being amplified by the amplifier 22.

The fingerprint detection period includes a first fingerprint detection sub-period and a second fingerprint detection sub-period, and the detection stage of each sensing circuit 10 includes a first detection sub-stage and a second detection sub-stage, which are in the first fingerprint detection sub-period and the second fingerprint detection sub-period, respectively. The second fingerprint detection sub-period follows the first fingerprint detection sub-period. In a same fingerprint detection period, any first detection sub-stage is prior to all of the second detection sub-stages. The driving circuit may drive the sensing circuits 10 line by line, and drive all of the sensing circuits 10 once in each fingerprint detection sub-period. In this case, the first detection sub-stages of the sensing circuits 10 in a same row coincide with each other, and the second detection sub-stages of the sensing circuits 10 in a same row also coincide with each other.

In some embodiments, the control circuit 40 may include a comparison sub-circuit 41, a plurality of switch sub-circuits 42, and a first control sub-circuit 43. FIG. 4 shows only one sensing circuit 10 and the switch sub-circuit 42 corresponding thereto. The comparison sub-circuit 41 is configured to obtain the sensing electrical signals output by all the sensing circuits 10 in the first fingerprint detection sub-period, and output the smallest one of the obtained sensing electrical signals as the reference signal. The plurality of switch sub-circuits 42 are in one-to-one correspondence with the plurality of analog-to-digital converters 21. A first input terminal of the switch sub-circuit 42 is coupled to an output terminal of the comparison sub-circuit 41; a second input terminal of the switch sub-circuit 42 is grounded; an output terminal of the switch sub-circuit 42 is coupled to the reference terminal Ref of the corresponding analog-to-digital converter 21. The first control sub-circuit 43 is configured to control the first input terminal and the output terminal of each switch sub-circuit 42 to be electrically connected in the second fingerprint detection sub-period, and to control the second input terminal and the output terminal of each switch sub-circuit 42 to be electrically connected in the first fingerprint detection sub-period. In some embodiments, the first control sub-circuit 43 is configured to control the first input terminal and the output terminal of the switch sub-circuit 42 to be electrically connected in the second detection sub-stage of each sensing circuit 10, and to control the second input terminal and the output terminal of the switch sub-circuit 42 to be electrically connected in the first detection sub-stage of each sensing circuit 10, so that in each first detection sub-stage, the reference terminals Ref of all the analog-to-digital converters 21 are grounded, and in each second detection sub-stage, the reference terminals Ref of all the analog-to-digital converters 21 receive the reference signal (i.e., the smallest one of the sensing electrical signals output by all the sensing circuits 10 in the first detection sub-period). Therefore, in any second detection sub-period in the second fingerprint detection sub-period, the difference between signals received by the signal input terminal In and the reference terminal Ref of the analog-to-digital converter 21 is: the difference between the sensing electrical signal output by the corresponding sensing circuit 10 in the second detection sub-stage and the smallest one of the sensing electrical signals output by all of the sensing circuits in the first fingerprint detection sub-period. Since the smallest one of all the sensing electrical signals is the common mode component of all the sensing electrical signals, the occupation of the dynamic range of the analog-to-digital converter 21 by the common mode component of the sensing electrical signals output by all the sensing circuits 10 is eliminated, and the conversion accuracy of the analog-to-digital converter 21 is improved.

In some embodiments, the fingerprint detection device may be a display device, and each pixel may also perform display. In this case, the comparison sub-circuit 41 may obtain only the sensing electrical signals output by the sensing circuits 10 covered by the fingerprint in the first fingerprint detection sub-period, and use the smallest one of the obtained sensing electrical signals as the reference signal. In some embodiments, a pixel having the smallest brightness may be obtained by detecting brightness, and the sensing electrical signal output by the sensing circuit 10 in the obtained pixel is the reference signal. In addition, each sensing circuit 10 may be driven by the driving circuit to receive the same or similar optical signals in the two fingerprint detection sub-periods in each fingerprint detection period.

As shown in FIG. 3, the fingerprint detection device further includes a calculation circuit 30, and the calculation circuit 30 is coupled to each analog-to-digital converter 21, and is configured to determine, in each fingerprint detection period, a difference between the sensing electrical signals output by any two adjacent sensing circuits 10 based on output signals of the analog-to-digital converters 21, and determine a difference between the optical signals received by the any two adjacent sensing circuits 10 according to the difference between the sensing electrical signals output by the any two adjacent sensing circuits 10, so as to determine a fingerprint image.

Figure 5:
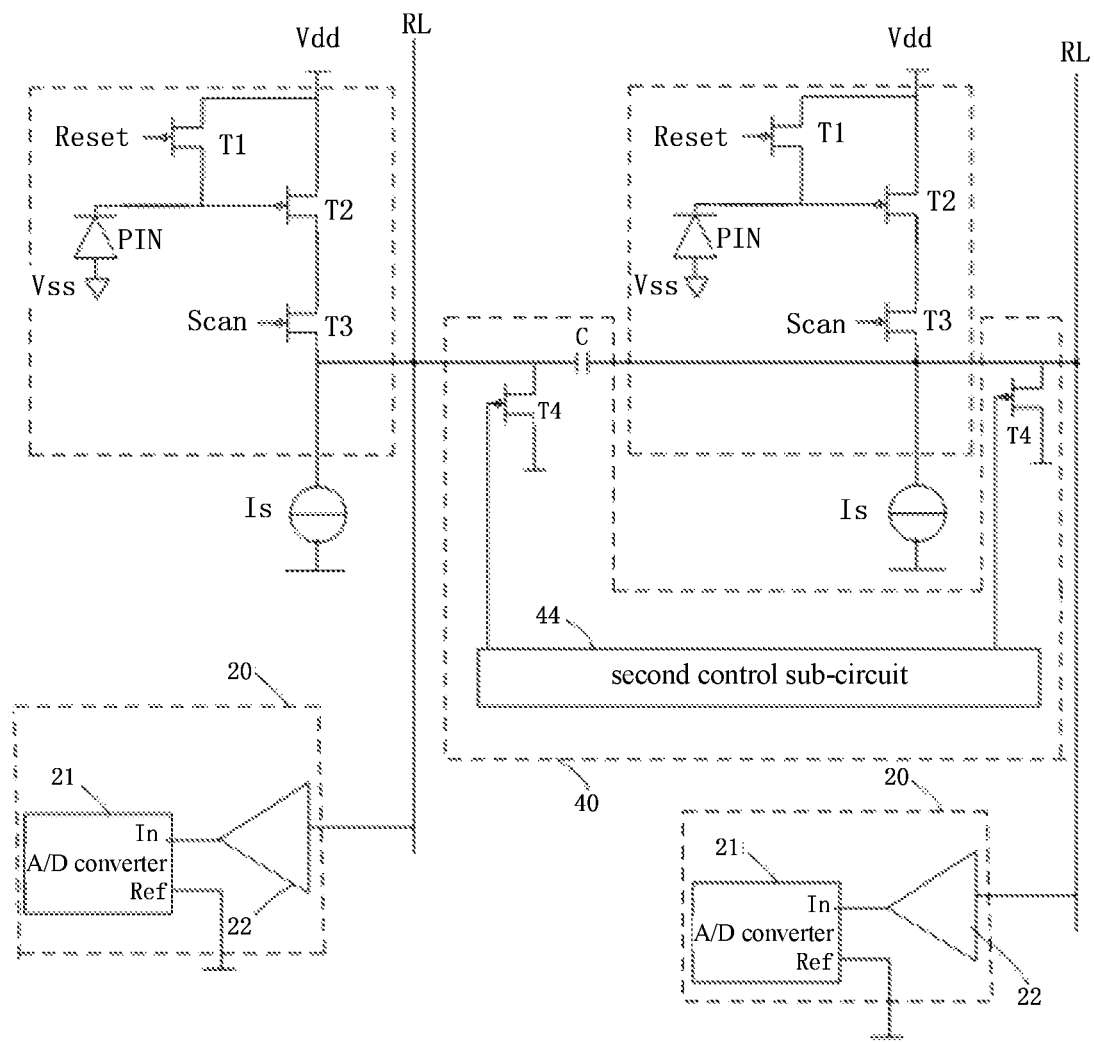
FIG. 5 is a schematic diagram illustrating connection between a sensing circuit, a control circuit, and a signal converter in a fingerprint detection device according to an embodiment of the present disclosure.

FIG. 5 is a schematic diagram illustrating connections between a sensing circuit, a control circuit, and a signal converter in a fingerprint detection device according to an embodiment of the present disclosure. The sensing circuit 10 in the embodiment has the same structure and the same connection with the signal readout line RL as those in the embodiment described with reference to FIG. 4, and is not described repeatedly here. In addition, similar to the above embodiment, the fingerprint detection period includes a first fingerprint detection sub-period and a second fingerprint detection sub-period, and the detection stage of each sensing circuit 10 includes a first detection sub-stage in the first fingerprint detection sub-period and a second detection sub-stage in the second fingerprint detection sub-period. The time at which the second fingerprint detection sub-period starts is after the time at which the first fingerprint detection sub-period starts. Certainly, it is not necessary to set each first detection sub-stage prior to all the second detection sub-stages, as long as it is ensured that the first detection sub-stage is prior to the second detection sub-stage in a same detection stage and the second detection sub-stages of the sensing circuits 10 in different rows do not overlap with each other. The fingerprint detection device may also include a driving circuit, and unlike the above-described embodiments, the driving circuit in the present embodiment may drive the sensing circuits 10 line by line only in the first fingerprint detection sub-period.

As shown in FIG. 5, the signal input terminal In of each analog-to-digital converter 21 is coupled to the output terminal of each sensing circuit 10 in the corresponding column through an amplifier 22; unlike the above-described embodiments, the reference terminal Ref of each analog-to-digital converter 21 is always grounded.

In addition, the control circuit 40 has a structure different from that in the above-described embodiments. As shown in FIG. 5, the control circuit 40 includes a plurality of capacitors C, a plurality of switching transistors T4, and a second control sub-circuit 44. The plurality of capacitors C are sequentially coupled in series in a predetermined order, and both terminals of each capacitor C are coupled to the output terminals of two adjacent sensing circuits 10, respectively, so that the output terminals of the plurality of sensing circuits 10 are sequentially coupled through the capacitors. FIG. 5 schematically shows only two sensing circuits 10 and the capacitor C therebetween. In some embodiments, the plurality of capacitors C are coupled in series in a serpentine form, that is, one capacitor C is coupled between every two adjacent sensing circuits 10 in the first row, one capacitor C is coupled between the last sensing circuit 10 in the first row and the last sensing circuit 10 in the second row, one capacitor is coupled between the first sensing circuit 10 in the second row and the first sensing circuit 10 in the third row, and so on. The switching transistors T4 are in one-to-one correspondence with the sensing circuits, and each switching transistor T4 has a control electrode coupled to the second control sub-circuit 44, a first electrode coupled to the output terminal of the corresponding sensing circuit 10, and a second electrode coupled to ground. The second control sub-circuit 44 is configured to provide, in the first detection sub-stage of each sensing circuit 10, a turn-off signal to the control electrode of the corresponding switching transistor T4, and provide, in the second detection sub-stage of each sensing circuit 10, a turn-on signal to the control electrode of the corresponding switching transistor T4. The calculation circuit 30 is coupled to each analog-to-digital converter 21, and configured to determine, in each fingerprint detection period, a difference between the sensing electrical signals output by any two adjacent sensing circuits 10 according to the output signals of the analog-to-digital converter 21, and determine a fingerprint image according to the difference between the sensing electrical signals output by any two adjacent sensing circuits 10.

A case in which the fingerprint detection period includes a first fingerprint detection sub-period and a second fingerprint detection sub-period, and the first detection sub-stage and the second detection sub-stage of each sensing circuit 10 are respectively in the first fingerprint detection sub-period and the second fingerprint detection sub-period is taken as an example. First, in the first fingerprint detection sub-period, two sensing circuits 10 output corresponding sensing electrical signals according to respectively received optical signals, the sensing electrical signal output by the left sensing circuit 10 is marked as X, and the sensing electrical signal output by the right sensing circuit 10 is marked as Y, and the voltage across both terminals of the capacitor C between the two sensing circuits 10 is the difference between X and Y. Then, in the second detection sub-stage of the left sensing circuit 10 in the second fingerprint detection sub-period, the left switching transistor T4 is turned on, so that the output terminal of the left sensing circuit 10 (i.e., one terminal of the capacitor C) is grounded, and due to the bootstrap effect of the capacitor C, the voltage at the other terminal of the capacitor C is accordingly reduced to Y-X, so that the input signal received by the signal input terminal of the right analog-to-digital converter 21 is the difference between the sensing electrical signals output by the two sensing circuits 10, and further, the right analog-to-digital converter 21 performs analog-to-digital conversion on the difference between the two sensing electrical signals. After the second control sub-circuit 44 controls the switching transistors T4 to be turned on one by one, the calculation circuit 30 can obtain the difference between the sensing electrical signals output by every two adjacent sensing circuits 10, so as to obtain the difference between the optical signals received by every two adjacent sensing circuits 10, and thus, can further obtain a spatial distribution diagram of light intensity, so as to further obtain information of the fingerprint.

It should be noted that, at the edge of the detection substrate, a difference between the sensing circuits 10 may not be detected accurately, for example, a capacitor is coupled between an output terminal of the last sensing circuit 10 in the first row and an output terminal of the last sensing circuit 10 in the second row, and the output terminals of the two sensing circuits 10 are coupled to a same signal readout line RLm, and in this case, the calculation circuit may consider that the optical signals received by the two sensing circuits 10 are the same during calculation. Therefore, in the process of obtaining fingerprint information by the calculation circuit, fingerprint information corresponding to positions at the first and last columns of sensing circuits 10 may not be calculated.

As another aspect of the present disclosure, there is provided a fingerprint detection method used in a fingerprint detection device. The fingerprint detection device includes a detection substrate and a signal converter 20, as described above, the detection substrate includes a plurality of pixels arranged in a plurality of rows and a plurality of columns, as shown in FIG. 3, a sensing circuit 10 is disposed in each pixel, the sensing circuit 10 is configured to receive an optical signal and output a corresponding sensing electrical signal according to the received optical signal; the signal converter 20 includes a plurality of analog-to-digital converters 21, and each analog-to-digital converter 21 corresponds to one column of sensing circuits 10. The fingerprint detection method includes steps of: obtaining, by the control circuit 40, a common mode component of sensing electrical signals output by the sensing circuits of at least part of the plurality of pixels, and providing, by the control circuit 40, information about the common mode component to the plurality of analog-to-digital converters 21; and performing, by each analog-to-digital converter 21, analog-to-digital conversion on a difference between the sensing electrical signal from the corresponding sensing circuit and the common mode component.

In a detection stage corresponding to any one sensing circuit 10, a common mode component of the sensing electrical signals output by at least two sensing circuits including the one sensing circuit 10 is obtained, and according to the obtained common mode component, an input signal is provided to a signal input terminal In of the analog-to-digital converter 21 corresponding to the one sensing circuit 10 and/or a reference signal is provided to a reference terminal of the analog-to-digital converter 21 corresponding to the one sensing circuit 10, so that a difference between signals received by the signal input terminal In and the reference terminal Ref of the analog-to-digital converter 21 is equal to a difference between the sensing electrical signal output by the corresponding sensing circuit 10 and the common mode component. This process may be performed by the control circuit 40.

The analog-to-digital converter 21 performs analog-to-digital conversion on the difference between the input signal received by its signal input terminal In and the reference signal received by its reference terminal Ref.

The detection stages corresponding to different sensing circuits 10 in a same column do not overlap with each other.

In the present disclosure, in the detection stage of any one sensing circuit 10, the difference between the signals received by the signal input terminal In and the reference terminal Ref of the analog-to-digital converter 21 corresponding to the sensing circuit 10 is the difference between the sensing electrical signal output by the sensing circuit 10 and the common mode component, thus, the common mode component of the sensing signals output by at least part of the sensing circuits 10 is removed, so that the occupation of the dynamic range of the analog-to-digital converter 21 by the common mode component is reduced, the conversion accuracy of the analog-to-digital converter 21 is further improved, and the accuracy of fingerprint identification can be improved without using a high-bit analog-to-digital converter.

In some embodiments, as shown in FIG. 4, the signal input terminal of each analog-to-digital converter 21 is coupled to the output terminal of each sensing circuit 10 in the corresponding column. The fingerprint detection period includes a first fingerprint detection sub-period and a second fingerprint detection sub-period, and the detection stage of each sensing circuit 10 includes a first detection sub-stage in the first fingerprint detection sub-period and a second detection sub-stage in the second fingerprint detection sub-period. The second fingerprint detection sub-period follows the first fingerprint detection sub-period. In a same fingerprint detection period, any first detection sub-stage is prior to all of the second detection sub-stages. The control circuit 40 may include a comparison sub-circuit 41, a plurality of switch sub-circuits 42, and a first control sub-circuit 43. Obtaining, by the control circuit 40, a common mode component of sensing electrical signals output by sensing circuits of at least part of the plurality of pixels, and providing, by the control circuit 40, information about the common mode component to the plurality of analog-to-digital converters 21 includes: in the first fingerprint detection sub-period, obtaining the sensing electrical signals output by at least part of sensing circuits by the comparison sub-circuit 41, and providing the smallest one of the obtained sensing electrical signals to the switch sub-circuit 42 as a reference signal; and in the second fingerprint detection sub-period, controlling, by the first control sub-circuit 43, the switch sub-circuit 42 to provide the reference signal to the reference terminal of the corresponding analog-to-digital converter 21. During the first fingerprint detection sub-period, the first control sub-circuit 43 controls the switch sub-circuit 42 to provide a grounded signal to the reference terminal of the corresponding analog-to-digital converter.

The step of "in a detection stage corresponding to any one sensing circuit 10, obtaining a common mode component of sensing electrical signals output by at least two sensing circuits including the one sensing circuit 10, and providing, according to the obtained common mode component, an input signal to a signal input terminal In of the analog-to-digital converter 21 corresponding to the one sensing circuit 10 and/or a reference signal to a reference terminal of the analog-to-digital converter 21 corresponding to the one sensing circuit 10" includes: in the first fingerprint detection sub-period, obtaining the sensing electrical signal output by each sensing circuit 10 in the first detection sub-stage of the sensing circuit 10, and taking the smallest one of the sensing electrical signals as the reference signal; in the second fingerprint detection sub-period, outputting the reference signal to the reference terminal of each analog-to-digital converter 21 in the second detection sub-stage of each sensing circuit 10. Then, a difference between the sensing electrical signals output by any two adjacent sensing circuits 10 is determined according to output signals of the analog-to-digital converters 21, and a difference between optical signals received by any two adjacent sensing circuits 10 is determined according to the difference between the sensing electrical signals output by any two adjacent sensing circuits 10, so as to determine a fingerprint image.

The sensing circuits 10 may be driven by a driving circuit to output the sensing electrical signals line by line, and the driving process and the fingerprint detection principle are described above and will not be repeated herein.

In some embodiments, the signal input terminal of each analog-to-digital converter 21 is coupled to the output terminal of each sensing circuit 10 in the corresponding column, and the reference terminal of each analog-to-digital converter 21 is grounded. As shown in FIG. 5, the control circuit includes: a plurality of capacitors C coupled in series in a predetermined order, both terminals of each capacitor C being coupled to output terminals of two adjacent sensing circuits 10, respectively; a plurality of switching transistors T4 in one-to-one correspondence with the plurality of sensing circuits 10, each switching transistor having a first electrode coupled to an output terminal of the corresponding sensing circuit 10 and a second electrode coupled to ground; and a second control sub-circuit 40 coupled to control electrodes of the plurality of switching transistors T4. The fingerprint detection period includes a first fingerprint detection sub-period and a second fingerprint detection sub-period. The detection stage of each sensing circuit 10 includes a first detection sub-stage in the first fingerprint detection sub-period and a second detection sub-stage in the second fingerprint detection sub-period. In a same detection stage, the first detection sub-stage is prior to the second detection sub-stage; the second detection sub-stages of different sensing circuits 10 do not overlap with each other.

The step of "in a detection stage corresponding to any one sensing circuit, obtaining a common mode component of sensing electrical signals output by at least two sensing circuits 10 including the one sensing circuit 10, and providing, according to the obtained common mode component, an input signal to a signal input terminal In of the analog-to-digital converter 21 corresponding to the one sensing circuit 10 and/or a reference signal to a reference terminal Ref of the analog-to-digital converter 21 corresponding to the one sensing circuit 10" includes:

in the first fingerprint detection sub-period, providing a turn-off signal to the control electrode of the corresponding switching transistor T4 during the first detection sub-stage of each sensing circuit 10; and in the second fingerprint detection sub-period, providing a turn-on signal to the control electrode of the corresponding switching transistor T4 during the second detection sub-stage of each sensing circuit 10. Then, a difference between the sensing electrical signals output by any two adjacent sensing circuits 10 is determined according to output signals of the analog-to-digital converters 21, and a difference between optical signals received by any two adjacent sensing circuits 10 is determined according to the difference between the sensing electrical signals output by any two adjacent sensing circuits 10, so as to determine a fingerprint image.

The sensing circuits 10 may be driven by a driving circuit to output the sensing electrical signals line by line, and the driving process and the fingerprint detection principle are described above and will not be repeated herein.

It should be noted that the control circuit in the present disclosure may be implemented by hardware and/or software. For example, the control circuit may be implemented as a processor and a memory storing a program, and the processor may implement the functions of the components (e.g., the comparison sub-circuit, the switch sub-circuit, the first control sub-circuit and the second control sub-circuit, etc.) in the control circuit when executing the program stored in the memory.

It could be understood that the above implementations are merely exemplary implementations used for illustrating the principle of the present disclosure, and the present disclosure is not limited thereto. Various variations and modifications can be made by those skilled in the art without departing from the spirit and scope of the present disclosure, and these variations and modifications are also considered to be within the protection scope of the present disclosure.

The invention claimed is:

1. A fingerprint detection device, comprising a detection substrate and a signal converter, wherein the detection substrate comprises a plurality of pixels arranged in a plurality of rows and a plurality of columns, each of the plurality of pixels comprises a sensing circuit configured to receive an optical signal and output a sensing electrical signal according to the received optical signal, and the signal converter comprises a plurality of analog-to-digital converters each coupled to one column of sensing circuits, wherein the fingerprint detection device further comprises a control circuit coupled to the sensing circuits and the plurality of analog-to-digital converters and configured to obtain a common mode component of sensing electrical signals output by the sensing circuits of at least part of the plurality of pixels and provide information about the common mode component to the plurality of analog-to-digital converters, and the analog-to-digital converter is configured to perform analog-to-digital conversion on a difference between the sensing electrical signal from a corresponding sensing circuit and the common mode component.

2. The fingerprint detection device of claim 1, wherein the analog-to-digital converter comprises a signal input terminal and a reference terminal, the control circuit is configured to provide the information about the common mode component to one of the signal input terminal and the reference terminal of the analog-to-digital converter such that a difference between signals received by the signal input terminal and the reference terminal of the analog-to-digital converter is equal to the difference between the sensing electrical signal from a corresponding sensing circuit and the common mode component.

3. The fingerprint detection device of claim 2, wherein the signal input terminal of each analog-to-digital converter is coupled to an output terminal of each sensing circuit in a corresponding column, and the control circuit comprises:

a comparison sub-circuit configured to obtain sensing electrical signals output by at least part of the sensing circuits and output a smallest one of the obtained sensing electrical signals as a reference signal in a first fingerprint detection sub-period;

a plurality of switch sub-circuits in one-to-one correspondence with the plurality of analog-to-digital converters, each switch sub-circuit having a first input terminal coupled to an output terminal of the comparison sub-circuit and an output terminal coupled to the reference terminal of a corresponding analog-to-digital converter; and a first control sub-circuit configured to control the first input terminal and the output terminal of each switch sub-circuit to be electrically connected to output the reference signal in a second fingerprint detection sub-period, the second fingerprint detection sub-period being subsequent to the first fingerprint detection sub-period.

4. The fingerprint detection device of claim 3, wherein the switch sub-circuit has a second input terminal coupled to ground, and the first control sub-circuit is further configured to control the second input terminal and the output terminal of each switch sub-circuit to be electrically connected in the first fingerprint detection sub-period.

5. The fingerprint detection device of claim 3, wherein the comparison sub-circuit obtains only sensing electrical signals output by the sensing circuits in an area of the detection substrate covered by a fingerprint, and outputs a smallest one of the obtained sensing electrical signals as the reference signal.

6. The fingerprint detection device of claim 3, wherein the comparison sub-circuit obtains a pixel having a smallest brightness by detecting brightness of each pixel, and outputs the sensing electrical signal output by the sensing circuit in the obtained pixel as the reference signal.

7. The fingerprint detection device of claim 2, wherein the signal input terminal of each analog-to-digital converter is coupled to an output terminal of each sensing circuit in a corresponding column, and the reference terminal of each analog-to-digital converter is grounded; and the control circuit comprises:

a plurality of capacitors sequentially coupled in series, both terminals of each of the plurality of capacitors being coupled to output terminals of two adjacent sensing circuits, respectively;

a plurality of switching transistors in one-to-one correspondence with the plurality of sensing circuits, each of the plurality of switching transistors having a first electrode coupled to an output terminal of a corresponding sensing circuit, and a second electrode coupled to ground; and a second control sub-circuit coupled to a control electrode of each switching transistor and configured to:

provide a turn-off signal to the control electrode of the switching transistor in a first fingerprint detection sub-period; and provide a turn-on signal to the control electrode of the switching transistor in a second fingerprint detection sub-period, a time at which the second fingerprint detection sub-period starts being subsequent to a time at which the first fingerprint detection sub-period starts.

8. The fingerprint detection device of claim 1, further comprising a calculation circuit coupled to each analog-to-digital converter and configured to determine a difference between sensing electrical signals output by any two adjacent sensing circuits according to an output signal of each analog-to-digital converter, and determine a fingerprint image according to the difference between the sensing electrical signals output by any two adjacent sensing circuits.

9. The fingerprint detection device of claim 1, wherein the sensing circuit comprises:
a photodiode having an anode coupled to a low-level signal terminal;
a first transistor having a control electrode coupled to a reset terminal of the sensing circuit, a first electrode coupled to a high-level signal terminal, and a second electrode coupled to a cathode of the photodiode;
a second transistor having a control electrode coupled to the cathode of the photodiode, and a first electrode coupled to the high-level signal terminal; and
a third transistor having a control electrode coupled to a scan terminal of the sensing circuit, a first electrode coupled to a second electrode of the second transistor, and a second electrode coupled to an output terminal of the sensing circuit;
wherein the output terminal of each sensing circuit is coupled to a current source.

10. The fingerprint detection device of claim 1, wherein the signal converter further comprises a plurality of amplifiers coupled to the plurality of analog-to-digital converters in one-to-one correspondence, each of the plurality of amplifiers having an output terminal coupled to a signal input terminal of a corresponding analog-to-digital converter, and an input terminal coupled to the output terminal of each sensing circuit in a corresponding column.

11. A fingerprint detection method for use in a fingerprint detection device, the fingerprint detection device comprising a detection substrate and a signal converter, the detection substrate comprising a plurality of pixels arranged in a plurality of rows and a plurality of columns, each pixel comprising a sensing circuit configured to receive an optical signal and output a sensing electrical signal according to the received optical signal; the signal converter comprising a plurality of analog-to-digital converters each coupled to one column of sensing circuits,
wherein the fingerprint detection method comprises:
obtaining a common mode component of sensing electrical signals output by the sensing circuits of at least part of the plurality of pixels and providing information about the common mode component to the plurality of analog-to-digital converters by a control circuit, and
performing, by the analog-to-digital converter, analog-to-digital conversion on a difference between the sensing electrical signal from a corresponding sensing circuit and the common mode component.

12. The fingerprint detection method of claim 11, wherein the analog-to-digital converter comprises a signal input terminal and a reference terminal, and
providing information about the common mode component to the plurality of analog-to-digital converters comprises: providing the information about the common mode component to one of the signal input terminal and the reference terminal of the analog-to-digital converter such that a difference between signals received by the signal input terminal and the reference terminal of the analog-to-digital converter is equal to a difference between the sensing electrical signal of a corresponding sensing circuit and the common mode component.

13. The fingerprint detection method of claim 12, wherein the signal input terminal of each analog-to-digital converter is coupled to an output terminal of each sensing circuit in a corresponding column, and the control circuit comprises a comparison sub-circuit, a switch sub-circuit and a first control sub-circuit,
obtaining a common mode component of sensing electrical signals output by the sensing circuits of at least part of the plurality of pixels and providing information about the common mode component to the plurality of analog-to-digital converters by a control circuit comprises:
in a first fingerprint detection sub-period, obtaining sensing electrical signals output by at least part of the sensing circuits and providing a smallest one of the obtained sensing electrical signals as a reference signal to the switch sub-circuit by the comparison sub-circuit; and
in a second fingerprint detection sub-period, controlling, by the first control sub-circuit, the switch sub-circuit to provide the reference signal to the reference terminal of a corresponding analog-to-digital converter, the second fingerprint detection sub-period being subsequent to the first fingerprint detection sub-period.

14. The fingerprint detection method of claim 13, wherein during the first fingerprint detection sub-period, the first control sub-circuit controls the switch sub-circuit to provide a grounded signal to the reference terminal of a corresponding analog-to-digital converter.

15. The fingerprint detection method of claim 13, wherein the comparison sub-circuit obtains only sensing electrical signals output by the sensing circuits in an area of the detection substrate covered by a fingerprint, and outputs a smallest one of the obtained sensing electrical signals as the reference signal.

16. The fingerprint detection method of claim 13, wherein the comparison sub-circuit obtains a pixel having a smallest brightness by detecting brightness of each pixel, and outputs the sensing electrical signal output by the sensing circuit in the obtained pixel as the reference signal.

17. The fingerprint detection method of claim 12, wherein the signal input terminal of each analog-to-digital converter is coupled to an output terminal of each sensing circuit in a corresponding column, and the reference terminal of each analog-to-digital converter is grounded;
the control circuit comprises: a plurality of capacitors sequentially coupled in series, both terminals of each of the plurality of capacitors being coupled to output terminals of two adjacent sensing circuits, respectively; a plurality of switching transistors in one-to-one correspondence with the plurality of sensing circuits, each switching transistor having a first electrode coupled to the output terminal of a corresponding sensing circuit, and a second electrode coupled to ground; and a second control sub-circuit coupled to a control electrode of each switching transistor,
obtaining a common mode component of sensing electrical signals output by the sensing circuits of at least part of the plurality of pixels and providing information about the common mode component to the plurality of analog-to-digital converters by a control circuit comprises: providing, by the second control sub-circuit, a turn-off signal to the control electrode of the switching transistor in a first fingerprint detection sub-period; and providing, by the second control sub-circuit, a turn-on signal to the control electrode of the switching transistor in a second fingerprint detection sub-period, wherein a time at which the second fingerprint detection sub-period starts is subsequent to a time at which the first fingerprint detection sub-period starts.

18. The fingerprint detection method of claim 11, wherein the fingerprint detection device further comprises a calculation circuit, and the fingerprint detection method further comprises:

determining a difference between the sensing electrical signals output by any two adjacent sensing circuits according to an output signal of each analog-to-digital converter and determining a fingerprint image according to the difference between the sensing electrical signals output by any two adjacent sensing circuits by the calculation circuit.

* * * * *